(12) United States Patent
Panizzolo

(10) Patent No.: US 6,477,455 B2
(45) Date of Patent: Nov. 5, 2002

(54) DEVICE TO CONTROL THE DYNAMIC STABILITY OF AN INDUSTRIAL VEHICLE

(75) Inventor: Fabrizio Panizzolo, Padova (IT)

(73) Assignee: Dana Italia S.p.A., Arco (IT)

( * ) Notice: Subject to any disclaimer, the term of this patent is extended or adjusted under 35 U.S.C. 154(b) by 0 days.

(21) Appl. No.: 09/891,076

(22) Filed: Jun. 25, 2001

(65) Prior Publication Data

US 2002/0002431 A1 Jan. 3, 2002

(30) Foreign Application Priority Data

Jun. 28, 2000 (IT) .......................................... MI00A1463

(51) Int. Cl.⁷ ............................................ B60G 21/073
(52) U.S. Cl. ............................ 701/37; 701/29; 701/31; 701/35; 701/39; 296/181; 280/124.161; 280/840
(58) Field of Search ................................. 701/37, 50, 29, 701/31, 35, 38, 39; 702/34; 296/181, 190; 180/89.12; 280/6.154, 124.161, 840

(56) References Cited

U.S. PATENT DOCUMENTS

| | | | |
|---|---|---|---|
| 4,058,178 A | | 11/1977 | Shinohara et al. .......... 177/146 |
| 5,447,331 A | * | 9/1995 | Barnhart ...................... 280/840 |
| 5,475,593 A | | 12/1995 | Townend ...................... 701/41 |
| 5,627,751 A | | 5/1997 | Davis et al. .................. 701/29 |
| 5,684,698 A | | 11/1997 | Fujii et al. .................... 701/38 |
| 5,997,013 A | * | 12/1999 | Claxton ................... 280/6.154 |
| 6,027,173 A | * | 2/2000 | Bettini ...................... 298/17 S |
| 6,073,066 A | * | 6/2000 | Takahashi .................... 701/37 |
| 6,139,118 A | * | 10/2000 | Hurst et al. ..................... 303/7 |
| 6,175,788 B1 | * | 1/2001 | Hasegawa et al. ............. 701/29 |
| 6,196,555 B1 | * | 3/2001 | Gaibler .................... 280/6.154 |

FOREIGN PATENT DOCUMENTS

| | | |
|---|---|---|
| DE | 3711239 | 10/1987 |
| EP | 0 675 069 A1 | 10/1995 |
| JP | 11091622 A * | 9/1997 |

OTHER PUBLICATIONS

European Search Report.

\* cited by examiner

Primary Examiner—William A. Cuchlinski, Jr.
Assistant Examiner—Tuan C To
(74) Attorney, Agent, or Firm—Hedman & Costigan, P.C.

(57) ABSTRACT

A device to control the dynamic stability of an industrial vehicle, where the chassis of the aforesaid vehicle is fitted with a pair of axles (10', 10"), extending from each of which are booms (12, 13, 12', 13'), fitted to the ends of which are articulated steering pivots (14, 15, 14'15') of the wheels of the aforesaid vehicle and where interposed between the axle (11) and the frame (16) of the aforesaid industrial vehicle are hydraulic cylinders (17, 17', 18, 18'), said control device providing that each hydraulic cylinder (17, 17', 18, 18') is associated with pressure transducers capable of indicating the loads weighing instantaneously on each wheel hub, thus permitting, by means of appropriate data processing, detection of the condition of stability of the vehicle, said pressure transducers (31–34) being associated with hydraulic cylinders (17, 17', 18, 18') so as to operate in real time to provide the initial data to process the conditions of stability on which to base the control of vehicle stability.

11 Claims, 3 Drawing Sheets

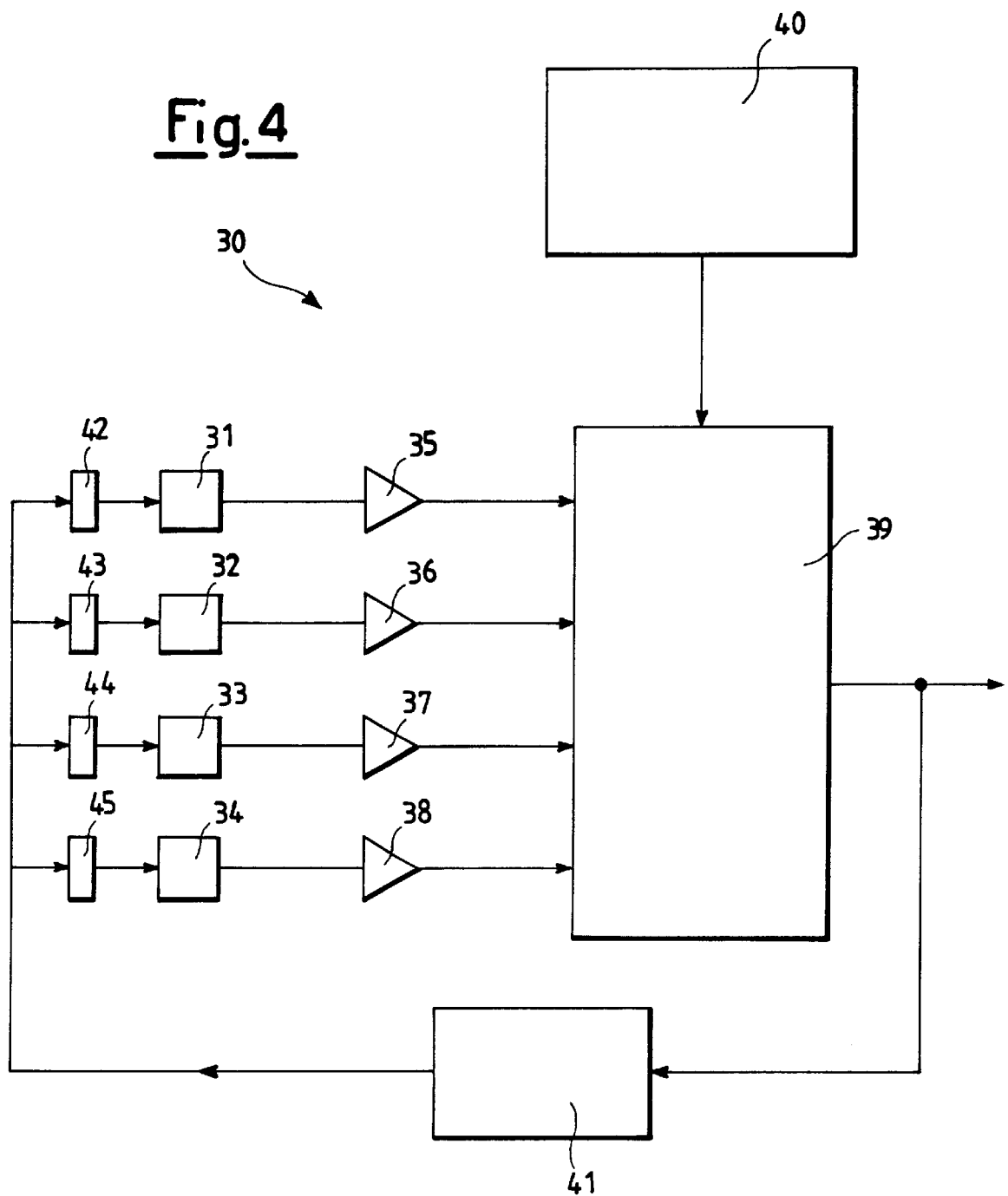

DEVICE TO CONTROL THE DYNAMIC STABILITY OF AN INDUSTRIAL VEHICLE

BACKGROUND OF THE INVENTION

The present invention relates to a device to control the dynamic stability of an industrial vehicle. More specifically, the device according to the present invention is appropriate to be fitted on an industrial vehicle such as lift trucks with telescoping boom, bucket loaders or back-hoe loaders, crane trucks, tractors and similar.

As is known, during operations to manoeuvre or work with these industrial vehicles, the casing or chassis of the vehicle is subjected to a plurality of external loads which can be schematised as forces and moments of forces that tend to influence the stability of the vehicle.

This is accentuated by these phenomena occurring with the vehicle fully loaded and/or on uneven ground. In fact, during operations to manoeuvre an industrial vehicle with suspensions, the entire casing or chassis of the vehicle is subjected to various stresses determined by a series of forces and overturning moments that are produced both due to movement of the load or due to variations in the stability of the vehicle in motion on the ground, all of which may occur in static, almost-static or dynamic conditions.

Measurement of external physical sizes is useful to determine the conditions of operation and stability of the vehicle; for example, it is possible to measure the vertical forces and overturning moments in the various directions of the space to calculate the stability of industrial vehicles with axles with suspensions, during the various manoeuvres of turning, braking, acceleration or lifting the load, in order to calculate the induced forces and the moments of destabilisation of the vehicle.

Currently, the operation to measure these forces and moments can be performed using specifically designed measurement instruments, only by simulation to be performed in the laboratory.

Moreover, to date, the various physical sizes of interest are measured approximately and placed in relation to one another by means of force transducers, which are fixed only externally to the casing of the axle or the chassis of the vehicle, thus influenced by all possible effects of disturbance or drift of the signal to be measured, which can be influenced by the effects of temperature, deflections of the structural components of the axle, operating pressures of the brakes, making the final information inaccurate and unreliable.

Therefore, fitting these transducers in specific positions of each rotating axle does not permit accurate measurements, as they are influenced by many external factors, in addition to those intrinsic to the geometry of the axle or the coupling of the axle with the vehicle chassis.

Lastly, all this requires the development of complex transformation algorithms, appropriate to translate the position through time of each vehicle axle into the fixed coordinates system of the vehicle.

SUMMARY OF THE INVENTION

The object of the present invention is, therefore, to produce a device for controlling the dynamic stability of an industrial vehicle which operates in an active and integrated mode in the vehicle, during its normal use, to guarantee the best conditions of stability and self-levelling of this vehicle.

Another object of the present invention is to produce a device for control of the dynamic stability of an industrial vehicle, which can be installed simply and which may allow an operator sitting in the cab to be informed of all conditions in the vicinity of the limit of stability in which the vehicle finds itself operating.

Yet another object of the present invention is to present a device for control of the dynamic stability of an industrial vehicle which considerably increases the reliability and overall comfort of the vehicle to which it is fitted, reducing stresses to which the chassis of the vehicle might be subjected.

These and other objects are attained by a device that controls the dynamic stability of an industrial vehicle, where the chassis of said vehicle is fitted with at least one pair of axles (10', 10"), extending from each of which are booms (12, 13, 12', 13') fitted to the ends of which are articulated steering pivots (14, 15, 14', 15') of the wheels of said vehicle, and where interposed between the axle (11) and the chassis (16) of said industrial vehicle are hydraulic cylinders (17, 17', 18, 18'), wherein each of said hydraulic cylinders (17, 17', 18, 18'), is associated with pressure transducers (31–34) capable of indicating the loads weighing instantaneously on each wheel hub, using said weight information from said pressure transducers (31–34) in data processing, recognition of the condition of stability of said vehicle, said pressure transducers (31–34) being associated with said hydraulic cylinders (17, 17', 18, 18') so as to detect and provide the control unit, as said information is received, (39) with input data on which to base assessment of the stability of said vehicle.

Further characteristics of the present invention are also defined in the subsequent claims.

BRIEF DESCRIPTION OF THE DRAWINGS

Further objects and advantages of the present invention shall become clearer from the description below and the annexed drawings, provided merely as an exemplary and non-limiting example, in which:

FIG. 4 shows a block diagram showing the operating logic of the device for control of the dynamic stability of an industrial vehicle, according to the present invention.

DETAILED DESCRIPTION OF THE INVENTION

Figure 1:
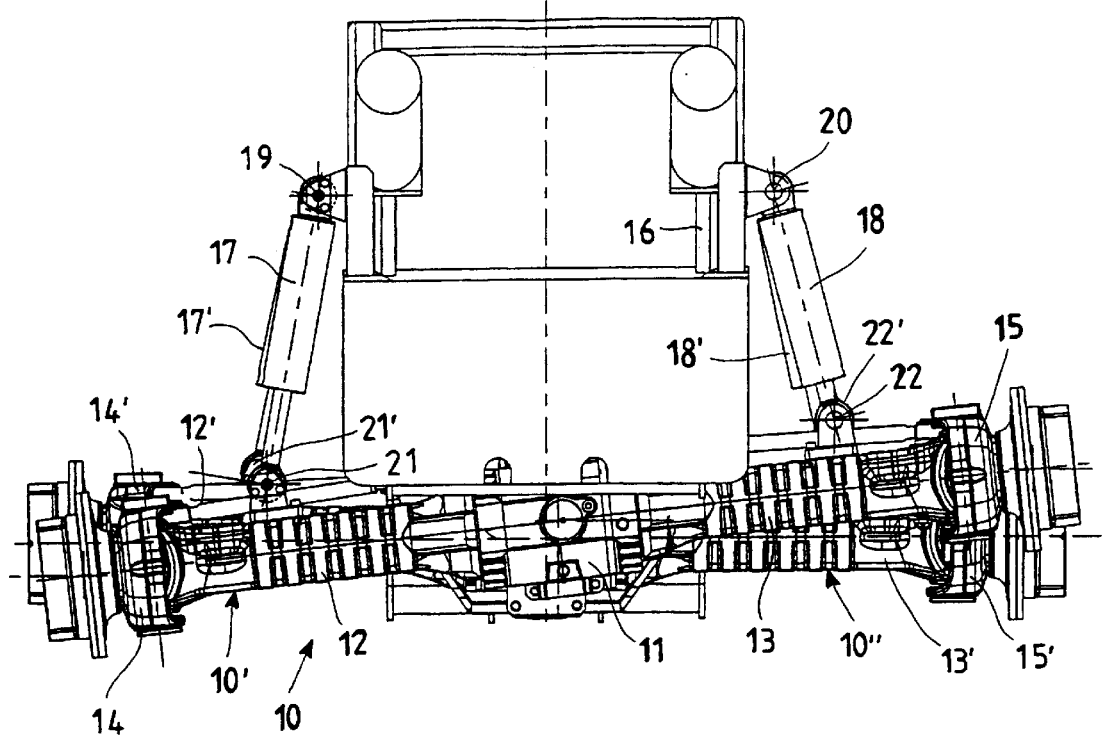
FIG. 1 shows a front view of a pair of axles, fitted on a generic chassis of an industrial vehicle, incorporating the device for control of the dynamic stability, according to the present invention, said axles being positioned mutually in a first operating position.
Figure 2:
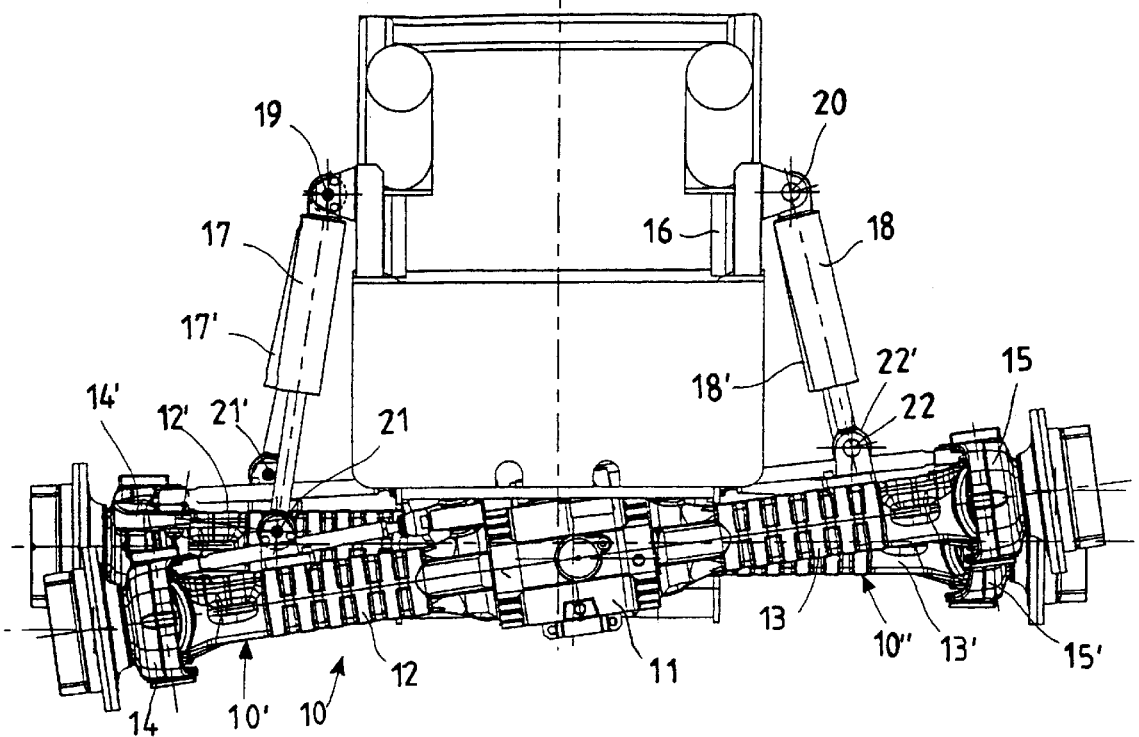
FIG. 2 shows a front view of the pair of axles in FIG. 1, in a second mutual operating position.

With specific reference firstly to FIG. 1–2, the axle assembly is indicated globally with the numeric reference 10, and in FIGS. 1–2 it can be seen that each axle 10', 10" comprises a central casing 11 from which booms 12 and 13 and 12' and 13' extend.

At the end of each of the booms 12, 13, 12' and 13' are articulated steering pivots 14, 15, 14', 15' of the wheels; said wheels are not shown for simplicity. The central casing 11 also supports a steering actuator, capable of making its rod slide axially.

Moreover, interposed between the axle 11 and the chassis 16 of the industrial vehicle are hydraulic cylinders 17, 17' and 18, 18'.

The hydraulic cylinders 17, 17' and 18, 18'are connected to hinges 19, 20 integral with the chassis 16.

The rods of the hydraulic cylinders 17, 17' and 18, 18' are instead connected to hinges 21, 22, 21' and 22' integral with the booms 12 and 13 and 12' and 13' of the axles 11.

The hydraulic cylinders 17, 17' and 18, 18' are fed by an electronically controlled hydraulic control unit. No further detailed description of the structure of the pair of axles and their assembly on the chassis of an industrial vehicle is given herein and, therefore, only the functional elements useful to interpret and actuate the invention are referred to.

Each of the hydraulic cylinders 17, 17' and 18, 18' is controlled by the device for control of the dynamic stability of an industrial vehicle, according to the present invention, the block diagram of which is shown globally with the numeric reference 30 in FIG. 4. The device 30 is firstly provided with pressure transducers 31, 32, 33 and 34, each of which is associated with a respective hydraulic cylinder 17, 17' and 18, 18'.

Each of the pressure transducers 31, 32, 33 and 34 transmits a signal to a respective amplifier 35, 36, 37 and 38 and these amplified signals are sent to a control unit 39.

The control unit 39 also receives, from a block 40, data relevant to the specific vehicle to which the device 30 is applied; in fact, the block 40 can memorize or receive data such as type of vehicle, weight, significant dimensions such as track, wheel base, length and significant angles of any lifting booms of crane trucks and/or similar vehicles, etc., all through an intelligent self-learning system which activates itself after installation of the device for stability of the vehicle coming off the assembly line. Taking account of the information received from the pressure transducers 31, 32, 33 and 34 together with the information received from the block 40, the control unit 39 processes a signal relevant to the condition of stability of the vehicle, all in real time.

This signal of the control unit 39 is further processed by a block 41 which transmits it to an appropriate logic-hydraulic system incorporating appropriate hydraulic valves to control the flow towards a plurality of actuation pipes 42, 43, 44 and 45, each of which is associated with one of the hydraulic cylinders 17, 17' and 18, 18'.

Essentially, the electronic circuit schematised in FIG. 4, by means of appropriate control software, processes data received from each pressure sensor 31, 32, 33, and 34, appropriately amplified, so as to calculate the stability of the vehicle in real time and take appropriate measures to dynamically balance the aforesaid vehicle, acting through the actuation pipes 42, 43, 44 and 45 independently on the hydraulic cylinders 17, 17' and 18, 18'.

More specifically, the pressure and oil volume inside each hydraulic cylinder 17, 17' and 18, 18' can be regulated by means of an appropriate logic-hydraulic system incorporating appropriate hydraulic valves to control flow.

In the case of industrial vehicles such as lift trucks with telescoping boom or industrial cranes, the device 30 also takes account of other important variables such as the extension of the boom of the crane and any downward inclination of the forks fitted to the end of this boom, as the load to be lifted is applied to the aforesaid ends and/or forks.

The system recognises the overturning moment, as a consequence recognising the decrease in the load on the axles, in particular on the rear axle, after having appropriately processed the data supplied for the purpose of stability.

If the industrial vehicle is not working on flat ground, the device according to the invention is capable of recognising the limit condition of lateral stability: the signal transmitted by the software could therefore disable vehicle starting, acting on the transmission to prevent motion.

It is also possible to associate the device 30 with an acoustic and/or visual warning device which indicates the possibility of limit condition of vehicle stability to the vehicle operator.

The characteristics of the device for control of the dynamic stability of an industrial vehicle, to which the present invention relates, become more apparent from the description above, as do the advantages. To pinpoint these advantages better the following considerations are set down.

The presence of the device described allows high reliability of the vehicle, simultaneously increasing the comfort of use.

Moreover, vehicles equipped with the device according to the invention are safer and easier to drive than those not fitted with the device.

This allows greater driving comfort and an overall decrease in stress and fatigue for the operator of the industrial vehicle, thus increasing productivity.

The device allows the vehicle to which it is fitted to be transformed into a dynamic system permitting prevention of dangerous limit conditions that would lead to instability of the vehicle.

It is clear that the device can be fitted to any type of axle with suspension, for example, also to axles without a Panhard rod, that is with different suspension geometries than those indicated herein.

The system of the invention thus allows active control to be obtained, especially with self-stabilisation of the vehicle, which is extremely interesting when moving at relatively high speeds off road, especially with a load at a considerable height from the ground.

It is also possible to actuate a longitudinal self-levelling mode of the vehicle in conditions of full load when travelling at low speeds.

Figure 3:
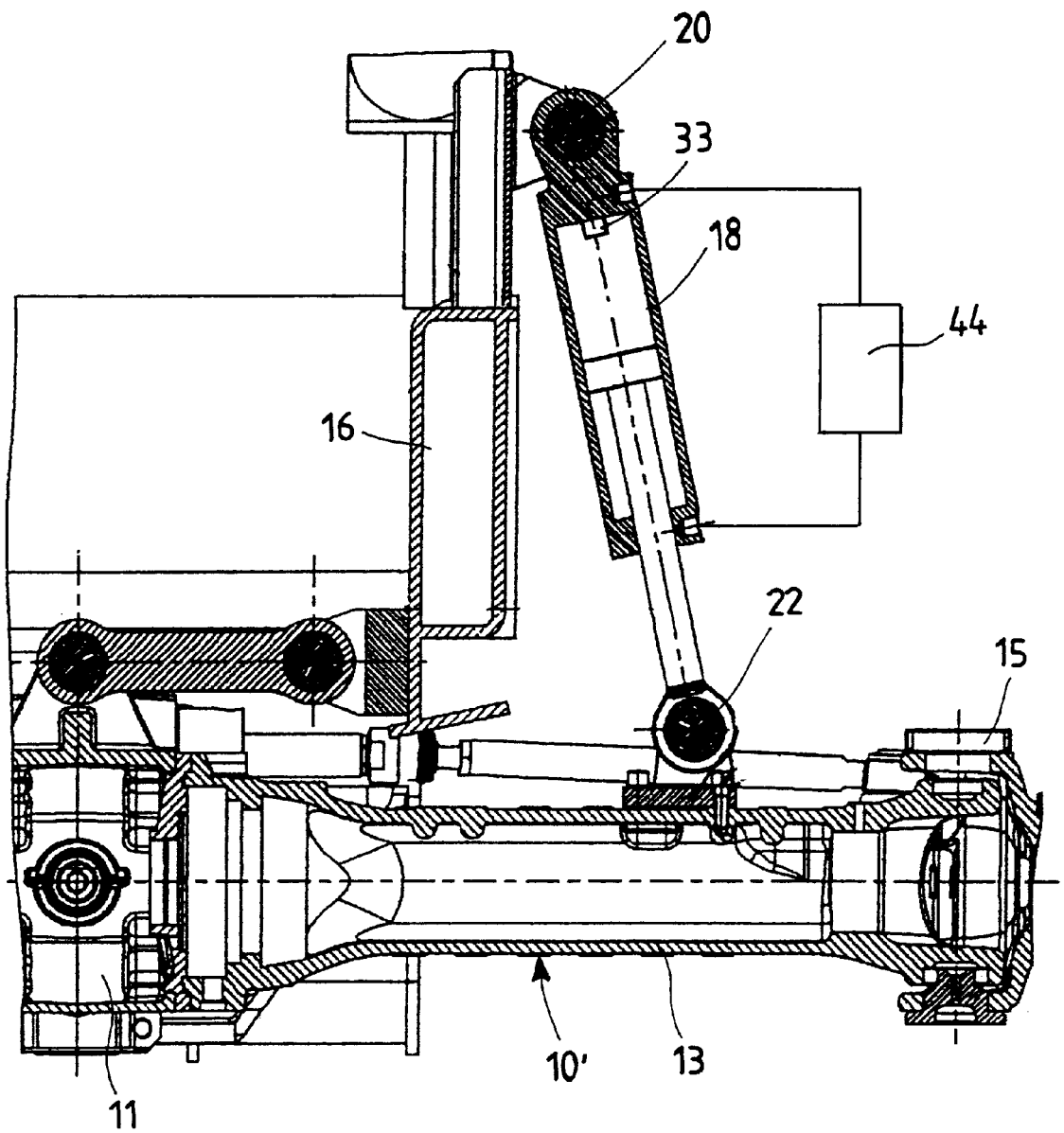
FIG. 3 shows a view, in a part section according to a plan perpendicular to the axis of one of the axles, of an assembly comprising part of the axle and a hydraulic cylinder, which sends pressure to a transducer positioned therein to electronically read the pressure measurement (on each wheel hub respectively) in order to process data required to establish conditions of dynamic stability of an industrial vehicle, according to the present invention.

In this case, the shock absorbing effect of the suspensions is deactivated, the axle thus acting as if it was connected rigidly to a component of the articulated quadrilateral identified between the chassis of the vehicle, the suspension cylinders, the axle and the Panhard rod, as in annexed FIG. 3.

Lastly, it is apparent that numerous other variants may be made to the device for control of the dynamic stability of an industrial vehicle, to which this invention relates, without departing from the principles of intrinsic novelty of the invention.

In the practical actuation of the invention, the materials, forms and dimensions of the details illustrated may vary according to requirements and these may be substituted with others of technical equivalence.

What is claimed is:

1. A device to control the dynamic stability of an industrial vehicle having wheels nd a wheel hubs where the chassis (16) of said vehicle is fitted with at least one pair of axles (10', 10"), extending from each of which are booms (12, 13, 12', 13') fitted to the ends of which are articulated steering pivots (14, 15, 14', 15') on which are mounted wheels of said industrial vehicle, and where interposed between an axle (11) and the chassis (16) of said industrial vehicle are hydraulic cylinders (17, 17', 18, 18'), wherein each of said hydraulic cylinders (17, 17', 18, 18'), are associated with pressure transducers (31–34) capable of instantaneously indicating the weight on each of said wheel hubs, a control unit (39) having an input means connected to said transducers 31–34, and data processing means for recognition of the condition of stability of said vehicle.

2. Device (30), as claimed in claim 1, characterised in that each of the aforesaid pressure transducers (31–34) is associated with at least one of the aforesaid hydraulic cylinders (17, 17', 18, 18'), so that each of the aforesaid pressure transducers (31–34) transmits its signal to the aforesaid control unit (39), which processes a signal relevant to the condition of stability of the vehicle, said cylinders being operated by said pipes (42–45).

3. Device (30), as claimed in claim 1 or 2, wherein said control unit (39) sends signals processed by it to an appropriate logic-hydraulic system incorporating appropriate hydraulic valves to control the flow of hydraulic fluid towards the pipes (42–45), each of which is associated with one of said hydraulic cylinders (17, 17', 18, 18') so as to act dynamically on the stability of said vehicle.

4. Device (30), as claimed in claim 2, wherein said control unit (39) receives from a block (40), data relevant to the particular vehicle to which the device (30) is fitted and processes a signal relevant to the condition of stability of the vehicle, also taking account of data acquired by said control unit (39), that is stored by the device (30) beginning when said vehicle is manufactured.

5. Device (30), as claimed in claim 4, wherein said block (40) operates by means of acquiring data from said transducers (31–34), and storing said data in said control unit (39) for incorporation into a self-learning system for stabilizing said vehicle.

6. Device (30), as claimed in claim 1, characterised in that the pressure inside the aforesaid hydraulic cylinders (17, 17', 18, 18') can be regulated by means of an appropriate logic-hydraulic circuit incorporating appropriate valves to control the flow.

7. Device (30), as claimed in claim 1, characterised in that each of the aforesaid pressure transducers (31, 32, 33, 34) is associated with a respective amplifier (35, 36, 37, 38) to send the aforesaid amplified signals to the aforesaid control unit (39).

8. Device (30), as claimed in claim 1, characterised in that it is capable of recognising variables such as the extension of the boom of the crane and any downward inclination of the forks fitted to the end of said boom that supports the actual load.

9. Device (30), as claimed in claim 1, characterised in that it is capable of recognising the limit condition of lateral stability, in the case of which it emits a signal that disables vehicle starting, acting on the transmission to thus prevent motion of the vehicle.

10. Device (30), as claimed in claim 1, characterised in that it is provided with an acoustic and/or visual warning device which warns the vehicle operator of the possibility of limit conditions of vehicle stability.

11. Device (30), as claimed in claim 1, characterised in that it is provided with a longitudinal self-levelling mode in conditions of full load when travelling at low speeds with the shock absorbing system of the suspensions deactivated.

* * * * *